(12) United States Patent
Sim et al.

(10) Patent No.: US 10,995,171 B2
(45) Date of Patent: May 4, 2021

(54) SYSTEM FOR CONTROLLING ETHYLENE VINYL ACETATE COPOLYMERIZATION PROCESS AND METHOD OF CONTROLLING THE SAME

(71) Applicant: LG Chem, Ltd., Seoul (KR)

(72) Inventors: Ye Seul Sim, Daejeon (KR); Kyu Hwang Lee, Daejeon (KR)

(73) Assignee: LG Chem, Ltd.

( * ) Notice: Subject to any disclaimer, the term of this patent is extended or adjusted under 35 U.S.C. 154(b) by 287 days.

(21) Appl. No.: 16/087,952

(22) PCT Filed: May 15, 2018

(86) PCT No.: PCT/KR2018/005564
§ 371 (c)(1),
(2) Date: Sep. 24, 2018

(87) PCT Pub. No.: WO2018/236053
PCT Pub. Date: Dec. 27, 2018

(65) Prior Publication Data
US 2020/0010592 A1    Jan. 9, 2020

(30) Foreign Application Priority Data

Jun. 20, 2017    (KR) .................. 10-2017-0078046

(51) Int. Cl.
*C08F 218/08*    (2006.01)
*G05B 13/02*    (2006.01)

(52) U.S. Cl.
CPC ............ *C08F 218/08* (2013.01); *G05B 13/02* (2013.01)

(58) Field of Classification Search
None
See application file for complete search history.

(56) References Cited

U.S. PATENT DOCUMENTS

| 3,636,087 A | 1/1972 | Caserio, Jr. |
| 5,208,367 A * | 5/1993 | Ou .................. B01D 3/38 |
| | | 203/96 |

(Continued)

FOREIGN PATENT DOCUMENTS

| CA | 2066533 A1 | 10/1992 |
| CN | 101018815 A | 8/2007 |

(Continued)

OTHER PUBLICATIONS

Extended European Search Report including the Written Opinion for Application No. EP 18769580.4 dated May 6, 2019.

(Continued)

*Primary Examiner* — Matthew D Krcha
(74) *Attorney, Agent, or Firm* — Lerner, David, Littenberg, Krumholz & Mentlik, LLP

(57) ABSTRACT

Disclosed are a system for controlling an ethylene vinyl acetate (EVA) copolymerization process and a method of controlling the same. The system for controlling the EVA copolymerization process may include a database for analysis configured to store analysis data obtained by matching processing conditions with measured data for first EVAs produced under the processing conditions, a computer programmed to estimate a VA content with respect to second EVA using the analysis data, a computer programmed to estimate a molecular weight distribution of the second EVA using the VA content estimated in the VA content estimation unit and processing factors corresponding thereto, and a computer programmed to estimate a recovery system blockage phenomenon using the VA content estimated and the molecular weight distribution estimated.

11 Claims, 4 Drawing Sheets

(56) References Cited

U.S. PATENT DOCUMENTS

| | | |
|---|---|---|
| 6,072,576 A | 6/2000 | McDonald et al. |
| 2002/0040107 A1 | 4/2002 | Kawahara et al. |
| 2002/0077438 A1 | 6/2002 | Nagao |
| 2004/0220359 A1 | 11/2004 | Abhari et al. |
| 2005/0215733 A1* | 9/2005 | Tsai .................. C08F 6/003 526/68 |
| 2010/0168330 A1 | 7/2010 | Demoirors et al. |
| 2014/0066530 A1 | 3/2014 | Shen et al. |
| 2014/0228604 A1 | 8/2014 | Colorado, Jr. et al. |
| 2014/0334515 A1 | 11/2014 | Hidalgo et al. |
| 2016/0297904 A1 | 10/2016 | Berbee et al. |

FOREIGN PATENT DOCUMENTS

| | | |
|---|---|---|
| CN | 102269681 A | 12/2011 |
| CN | 104502221 A | 4/2015 |
| CN | 104603190 A | 5/2015 |
| CN | 104629083 A | 5/2015 |
| CN | 105829362 A | 8/2016 |
| EP | 1162216 A1 | 12/2001 |
| JP | H05148307 A | 6/1993 |
| JP | 2001508354 A | 6/2001 |
| JP | 2002128807 A | 5/2002 |
| JP | 2003076934 A | 3/2003 |
| JP | 3947550 B2 | 7/2007 |
| JP | 4330253 B2 | 9/2009 |
| JP | 2011514928 A | 5/2011 |
| JP | 2014522486 A | 9/2014 |
| KR | 19830000167 B | 2/1983 |
| KR | 100748751 B1 | 8/2007 |
| KR | 20090039955 A | 4/2009 |
| KR | 20150119115 A | 10/2015 |
| KR | 20170075361 A | 7/2017 |
| WO | 2016210235 A1 | 12/2016 |

OTHER PUBLICATIONS

Chien IL, Kan TW, Chen BS. Dynamic simulation and operation of a high pressure ethylene-vinyl acetate (EVA) copolymerization autoclave reactor. Computers & chemical engineering. Jan. 19, 2007;31(3):233-45.

Lee HY, Yang TH, Chien IL, Huang HP. Grade transition using dynamic neural networks for an industrial high-pressure ethylene-vinyl acetate (EVA) copolymerization process. Computers & Chemical Engineering. Aug. 12, 2009;33(8):1371-8.

International Search Report for PCT/KR2018/005564 dated Aug. 22, 2018.

Chinese Search Report for Application No. 201880001595.9, dated Nov. 4, 2020, pp. 1-2.

* cited by examiner

SYSTEM FOR CONTROLLING ETHYLENE VINYL ACETATE COPOLYMERIZATION PROCESS AND METHOD OF CONTROLLING THE SAME

CROSS-REFERENCE TO RELATED APPLICATIONS

The present application is a national phase entry under 35 U.S.C. nal phase entry under CATION beginning on/KR2018/005564 filed on May 15, 2018, which claims priority from Korean Patent Application No. 10-2017-0078046, filed on Jun. 20, 2017, the disclosures of which are incorporated herein by reference.

TECHNICAL FIELD

The present invention relates to a system for controlling an ethylene vinyl acetate copolymerization process and a method of controlling the same, and more particularly, to a system for controlling an ethylene vinyl acetate (EVA) copolymerization process, which predicts a degree of blockage in a raw material recovery process and thus controls a copolymerization process so as to facilitate continuous production without blockage in the recovery process, and a method of controlling the same.

BACKGROUND ART

Generally, EVA is a thermoplastic material produced by copolymerizing ethylene and vinyl acetate (hereinafter, abbreviated to VA).

EVA supplements shortcomings of preexisting ethylene by utilizing the high elasticity, adhesion and transparency of VA.

In a process of producing such EVA, due to a low conversion rate resulting from the low reactivity of VA, it is necessary to recover a large amount of unreacted raw materials. Incidentally, due to the high adhesion of VA, a recovery system blockage phenomenon frequently occurs in a process of recovering raw materials, and thus there is difficulty in continuous production, resulting in degradation of the quality of a finished product (EVA).

DISCLOSURE

Technical Problem

The present invention is directed to providing a system and method for predicting a degree of blockage to prevent blockage during a process of recovering a raw material in an EVA copolymerization process, and thus controlling the copolymerization process.

Technical Solution

A system for controlling an EVA copolymerization process according to an exemplary embodiment of the present invention may include a database for analysis, which is configured to store analysis data matching processing conditions with measured data for first EVAs produced under the processing conditions, a VA content estimation unit, which is a computer programmed to estimate a VA content of second EVA using the analysis data, a molecular weight distribution estimation unit, which is a computer programmed to estimate a molecular weight distribution of the second EVA using the VA content estimated in the VA content estimation unit and processing factors corresponding thereto, and a recovery system blockage estimation unit, which is a computer programmed to estimate a recovery system blockage phenomenon using the VA content estimated in the VA content estimation unit and the molecule weight distribution estimated in the molecular weight distribution estimation unit.

A method of controlling an EVA copolymerization process according to an exemplary embodiment of the present invention may include estimating a VA content of EVA with respect to given processing conditions, estimating a molecular weight distribution of the EVA using the estimated VA content and processing factors corresponding thereto, and predicting a degree of recovery system blockage using the estimated VA content and molecular weight distribution.

The technical problems of the present invention are not limited to the above description, and other technical objects, which are not mentioned above, will be clearly understood by those of skill in the art from the following descriptions.

Advantageous Effects

The present invention can prevent a decrease in the quality of EVA, which occurs due to blockage in a recovery process, in a manner that prevents blockage in advance by estimating a degree of recovery system blockage caused by a raw material recovered in an EVA copolymerization process.

BEST MODE FOR CARRYING OUT THE INVENTION

Figure 1:
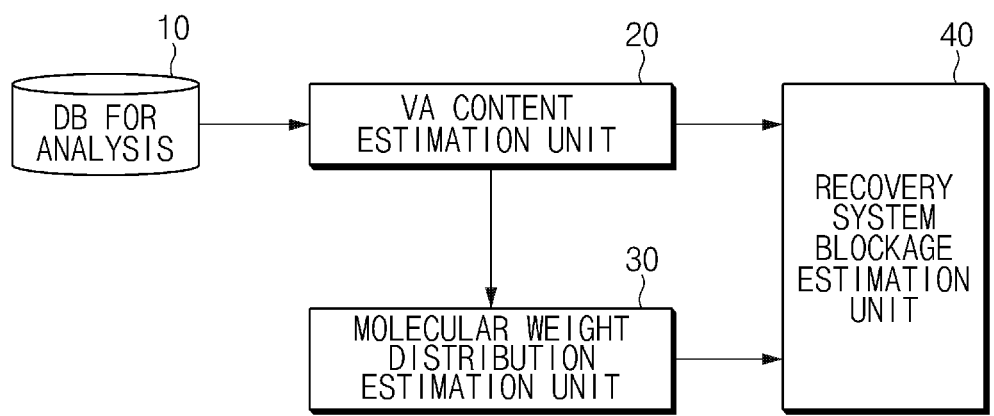
FIG. 1 is a diagram schematically illustrating the configuration of a system for controlling an EVA copolymerization process according to an exemplary embodiment of the present invention.

A system for controlling an EVA copolymerization process according to an exemplary embodiment of the present invention may include a database for analysis, which is configured to store analysis data matching processing conditions with measured data for first EVAs produced under the processing conditions, a VA content estimation unit, which is a computer programmed to estimate a VA content of second EVA using the analysis data, a molecular weight distribution estimation unit, which is a computer programmed to estimate a molecular weight distribution of the second EVA using the VA content estimated in the VA content estimation unit and a processing factor corresponding thereto, and a recovery system blockage estimation unit, which is a computer programmed to estimate a recovery system blockage phenomenon using the VA content estimated in the VA content estimation unit and the molecule weight distribution estimated in the molecular weight distribution estimation unit.

MODES OF THE INVENTION

Hereinafter, some exemplary embodiments of the present invention will be described in detail with reference to exemplary drawings. It should be noted that, when reference numerals are assigned to components of each drawing, like components are denoted by the same reference numerals, even if they are represented on other drawings. In addition, in explanation of embodiments of the present invention, detailed descriptions of known configurations or functions related thereto will be omitted when it is determined that the detailed descriptions would hinder the understanding of embodiments of the present invention.

FIG. 1 is a diagram schematically illustrating the configuration of a system for controlling an EVA copolymerization process according to an exemplary embodiment of the present invention.

The control system of FIG. 1 may include a database (DB) for analysis 10, a VA content estimation unit 20, a molecular weight distribution estimation unit 30, and a recovery system blockage estimation unit 40.

The DB for analysis 10 stores analysis data matching information on processing conditions (e.g., the amount of a pure raw material, the input amount of an initiator (reaction catalyst), a processing temperature, etc.) with measured data (VA content and molecular weight distribution) for EVA actually produced in a production site (plant) under the corresponding processing conditions. For example, a system operator regularly (or irregularly) samples EVAs produced in a production site, measures VA contents and a molecular weight distribution thereof using analytical laboratory instruments and matches the measured values with processing conditions for the corresponding EVA, and then the matching data is stored in the DB for analysis 10. Here, the processing conditions for the sampled EVA may be provided by a plant information system (PIS) for collecting and integratedly managing processing data in a production site in real time.

The VA content estimation unit 20 estimates a VA content of EVA produced in an EVA copolymerization process according to current processing conditions using the analysis data stored in the DB for analysis 10. To this end, the VA content estimation unit 20 predicts information on unreacted raw materials (recovered raw materials) recovered in an EVA copolymerization process through mathematical optimization using the analysis data stored in the DB for analysis 10, and estimates a VA content of a final product (EVA) in which the estimated recovered raw materials are reflected.

In the EVA copolymerization process, because of the low reactivity of VA, a large amount of VA cannot be directly converted into EVA, and therefore a recovery process of recovering unreacted raw materials and inputting the recovered raw materials to a reactor is needed. However, in a high-temperature and high-pressure production site, it is difficult to confirm a conversion rate of the reactor and actually measure the amount of unreacted raw materials in a recovery process. In addition, since the final product (EVA) is prepared by the reaction of pure raw materials with recovered raw materials in a reactor, to estimate the VA content of the final product, information on the recovered raw materials is needed. Accordingly, the VA content estimation unit 20 predicts the amount of the recovered raw materials for the corresponding EVA through mathematical optimization using analysis data for the EVAs regularly sampled in the production site, and estimates the VA content in which information on the estimated recovered raw materials is reflected. For example, the VA content estimation unit 20 arithmetically calculates the VA content and the molecular weight distribution by applying information on pure raw materials input to the reactor and information on a processing temperature to known mathematical formulas (material balance equation and heat balance equation), and the calculated values are compared with the measured data (the VA content and the molecular weight distribution) corresponding to the corresponding processing conditions stored in the DB for analysis 10 to figure out a value of the recovered raw material that minimizes an error. At this time, the VA content calculated with the recovered raw material value that minimizes an error becomes an estimated VA content with respect to EVA. A method of predicting such a recovered raw material and estimating a VA content will be described in detail below.

The molecular weight distribution estimation unit 30 estimates a molecular weight distribution with respect to the given processing conditions by applying the VA content value estimated in the VA content estimation unit 20 and a processing factor (the input amount of an initiator) corresponding to the VA content to a statistical regression model, which is a multivariate statistical analysis method. Here, the statistical regression model may be built using the analysis data stored in the DB for analysis 10, and as a regression analysis method, partial least squares regression may be used. For example, the molecular weight distribution estimation unit 30 may build a statistical regression model with respect to a VA content, the input amount of an initiator and a molecular weight distribution by performing regression analysis using a VA content and the input amount of an initiator as independent variables and the molecular weight distribution corresponding thereto as a dependent variable in the analysis data stored in the DB for analysis 10, and then may estimate the molecular weight distribution by applying the VA content estimated in the VA content estimation unit 20 to the statistical regression model. The present invention is not characterized by only building a regression model, but also building a regression model using measured data for EVAs actually produced in a production site and estimating a molecular weight distribution by applying the VA content estimated in the VA content estimation unit 20 to the regression model. Therefore, the multivariate statistical analysis method for building a regression model may be any method without limitation, and in the exemplary embodiment, description of such a statistical analysis method will be omitted.

The recovery system blockage estimation unit 40 estimates blockage caused by an unreacted raw material under given processing conditions using the VA content estimated in the VA content estimation unit 30 and the molecular weight distribution estimated in the molecular weight distribution estimation unit 30, and according to the result, controls the processing conditions. For example, the recovery system blockage estimation unit 40 calculates a pressure difference (differential pressure) in a recovery system for recovering an unreacted raw material using the estimated VA content and molecular weight distribution, and may adjust the amount of an initiator that is input to the reactor according to the differential pressure. Indeed, all of raw materials that do not participate in the reaction in the reactor and thus are recovered are not reinput to the reactor as some of the raw materials are attached to the recovery system due to the high adhesion of VA, resulting in blockage in the raw material recovery process. A flow of the recovered raw materials is made due to a pressure difference made by the recovery system, and the differential pressure is changed according to a degree of blocking the raw material flow. That is, there is a relationship between the differential pressure for the flow of the raw materials and a degree of the blockage of the recovery system. Accordingly, the recovery system blockage estimation unit 40 calculates a differential pressure using the estimated VA content and molecular weight distribution, and when the differential pressure is higher than a specific level, the input amount of an initiator is adjusted to lower the differential pressure.

Figure 2:
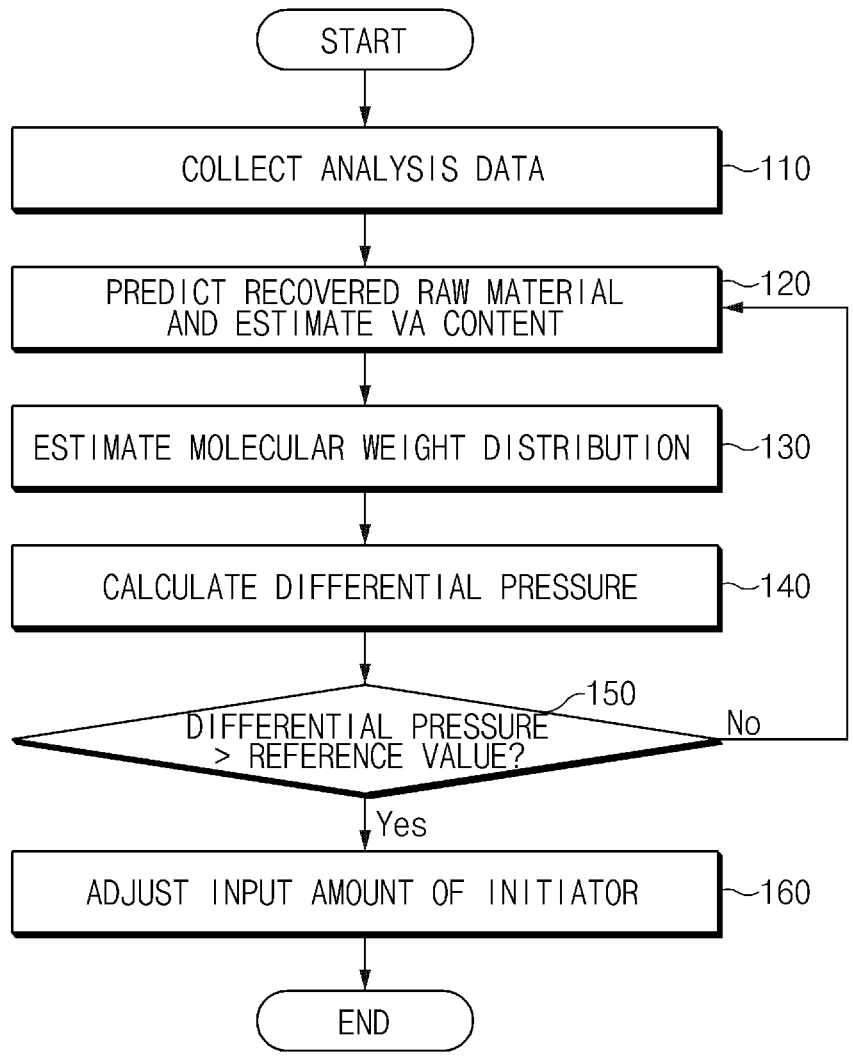
FIG. 2 is a flowchart illustrating a method of controlling an EVA copolymerization process according to an exemplary embodiment of the present invention.

FIG. 2 is a flowchart illustrating a method of controlling an EVA copolymerization process according to an exemplary embodiment of the present invention.

First, a system operator regularly (e.g., every Monday) samples EVA produced in an actual EVA production site, measures VA contents and a molecular weight distribution of the EVAs using laboratory instruments, continuously collects analysis data in which measured values are matched with processing conditions for the production of corresponding EVA, and stores the analysis data in a DB for analysis 10 (Step 110).

For example, a system operator matches data measured in a laboratory with processing conditions collected through a plant information system for corresponding EVA and stores the data in a DB for analysis 10. Here, the processing conditions may include the amount of a pure raw material input to a reactor, the amount of an initiator, a processing temperature, etc. The measured data for the produced EVA is preferably measured on a regular basis, but may be irregularly sampled or measured whenever the processing conditions are changed.

Figure 3:
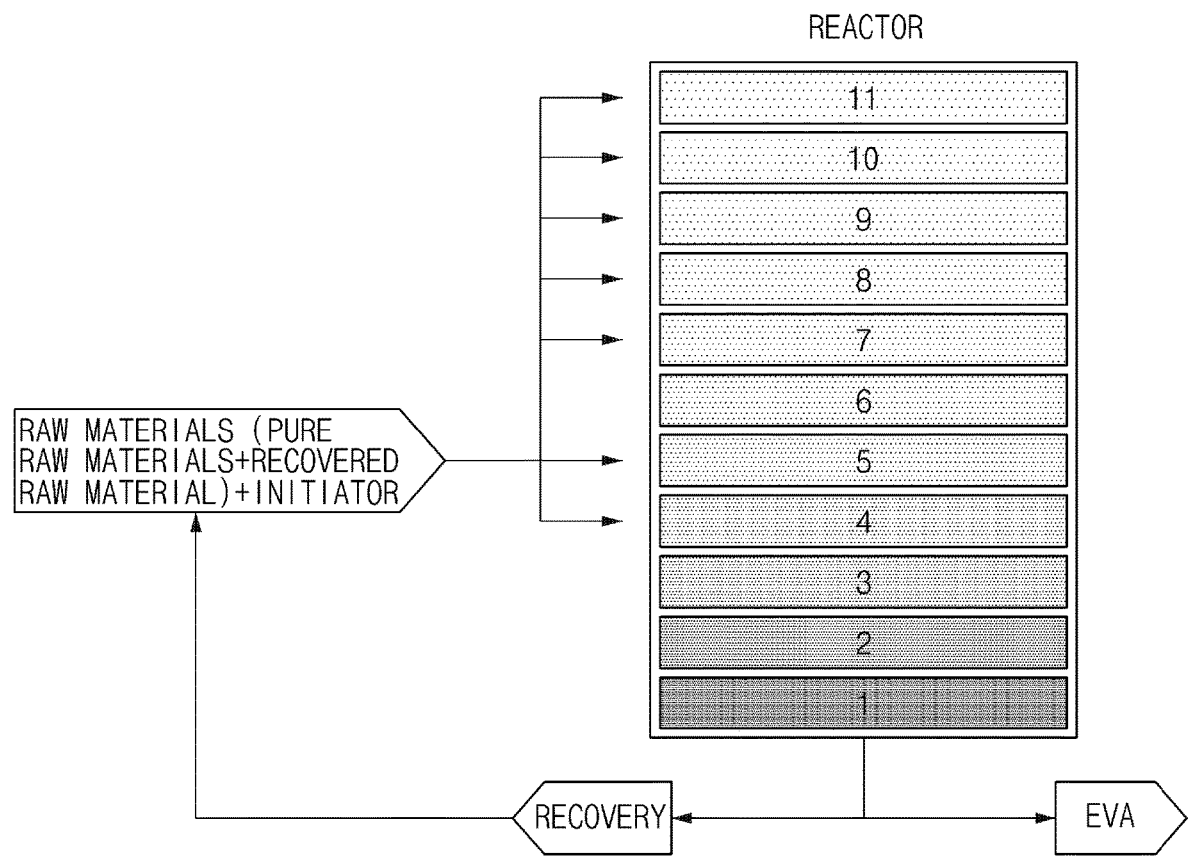
FIG. 3 is a diagram modeling an EVA copolymerization process according to an exemplary embodiment of the present invention.

In addition, a copolymerization process applied to the present embodiment may be performed by inputting raw materials (pure raw material+recovered raw material) and an initiator to a multi-step reactor as shown in FIG. 3 in consideration of the low conversion rate of VA.

The VA content estimation unit 20 predicts a recovered raw material in the present copolymerization process (or under specific processing conditions in the future) using analysis data stored in the DB for analysis 10 (previous data), and predicts a VA content of EVA produced through such a process (Step 120).

To this end, first, the VA content estimation unit 20 arithmetically calculates a VA content and a molecular weight distribution using a pure raw material input to the reactor and a processing temperature in a current copolymerization process. Here, the VA content and the molecular weight distribution can be arithmetically calculated by calculating the heat of reaction using known mathematical formulas (material balance equation and heat balance equation), and a conversion rate using these results. With respect to the given processing conditions, a method of calculating the VA content and the molecular weight distribution through arithmetical calculation may be any one of the known methods. Accordingly, in the exemplary embodiment, description of the calculation method will be omitted.

However, actually produced EVA is not only produced using pure raw materials, but also using recovered, unreacted raw materials (recovered raw materials).

FIG. 3 is a diagram modeling an EVA copolymerization process according to an exemplary embodiment of the present invention, and in the copolymerization process, as well as pure raw materials, recovered raw materials are reinput to the reactor for a reaction. Accordingly, to more exactly estimate a VA content and a molecular weight distribution of EVA, information on the recovered raw material has to be reflected.

To this end, the VA content estimation unit 20 figures out a value of the recovered raw material that minimizes an error by comparing the VA content and the molecular weight distribution calculated using the pure raw materials with the measured data (VA content and molecular weight distribution) for EVA produced under the same processing conditions of the analysis data stored in the DB for analysis 10.

Since the VA content values and molecular weight distribution values measured in a laboratory are values in which both of the pure raw materials and the recovered raw material are reflected, they have a difference from values calculated by only reflecting the pure raw materials. Such difference may be caused by the recovered raw material. That is, since the processing conditions (the pure raw materials and the processing temperature) are the same, the measured values are considered fixed values (constants), and therefore a mathematical relationship in which a recovered raw material value is set as an independent variable (x), and an error between the calculated value and the measured value is set as a dependent variable (y) may be formed.

According to such a mathematical relationship, the VA content estimation unit 20 first calculates a VA content and a molecular weight distribution only using values of pure raw materials, calculates an error by comparing the calculated VA content and molecular weight distribution with analysis data of the processing conditions (VA content and molecular weight distribution), and estimates values of recovered raw materials that can minimize the error.

Subsequently, the VA content estimation unit 20 calculates a VA content and a molecular weight distribution again by reflecting the estimated values of the recovered raw materials (pure raw material+estimated recovered raw material), and recalculates an error by comparing the calculated data with corresponding analysis data. That is, in the beginning, a VA content and a molecular weight distribution have been calculated only using information on a pure raw material as information on a raw material, but from that point, a VA content and a molecular weight distribution are calculated using a value in which an estimated recovered raw material is added to a pure raw material as raw material information.

Afterward, the VA content estimation unit 20 repeatedly calculates a VA content and a molecular weight distribution by revising the estimated value of a recovered raw material and reflecting a newly estimated value of a recovered raw material, and thereby finds a recovered raw material value that minimizes an error. Here, when the value of the recovered raw material that minimizes the error is determined, a VA content calculated with the value ultimately becomes an estimated value of a VA content to be obtained.

When the VA content is estimated, the molecular weight distribution estimation unit 30 estimates a molecular weight distribution through multivariate statistical analysis of the VA content value estimated in the VA content estimation unit 20 and the amount of an initiator input to the current process (Step 130).

For example, the molecular weight distribution estimation unit 30 may estimate a molecular weight distribution of EVA produced by a current copolymerization process by applying the VA content value estimated in the VA content estimation unit 20 and the input amount of an initiator used in the current process to a statistical regression model.

Here, the statistical regression model may be built using analysis data stored in the DB for analysis 10, and as the regression analysis method, partial least squares regression may be used. For example, the molecular weight distribution estimation unit 30 may build a statistical regression model with respect to a VA content, the amount of an initiator and a molecular weight distribution by performing regression analysis using the VA content and the amount of an initiator in the analysis data stored in the DB for analysis 10 as independent variables and the molecular weight distribution corresponding thereto as a dependent variable. Such a statistical regression model may be newly built by reflecting analysis data whenever new analysis data is stored in the DB for analysis 10, or newly built on a regular basis.

When the molecular weight distribution is estimated, the recovery system blockage estimation unit 40 calculates a differential pressure with respect to the flow of an unreacted raw material recovered in a current copolymerization process using the estimated molecular weight distribution and the VA content estimated in Step 120 (Step 140).

Some of the raw materials that do not participate in the reaction in the reactor and thus recovered are attached to the recovery system due to the high adhesion of VA, resulting in blockage in a raw material recovery process. Like this, when the recovered raw material is attached to the recovery system and the flow of other recovered raw materials is hindered, a pressure difference (differential pressure) is generated according to a degree of blockage.

Here, since the pressure difference (ΔPressure) in the recovery process is associated with the flow of a recovered raw material, as shown in the following equations, the pressure difference may be expressed as a function of the amount of the flowing recovered raw material (flow amount), and coefficients (A, B and C) of the function may be expressed as a linear relationship between melt indexes and VA contents and a molecular weight distribution value (average molecular weight).

$$\Delta Pressure = A + B \times Flow^C$$

$$A = A_0 + A_{VA} \times VA + A_{MI} \times MI$$

$$B = B_0 + B_{VA} \times VA + B_{MI} \times MI$$

$$C = C_0 + C_{VA} \times VA + C_{MI} \times MI$$

Here, the "Flow" refers to a flow amount, the "VA" refers to a VA content, and the "MI" refers to an average molecular weight.

Figure 4:
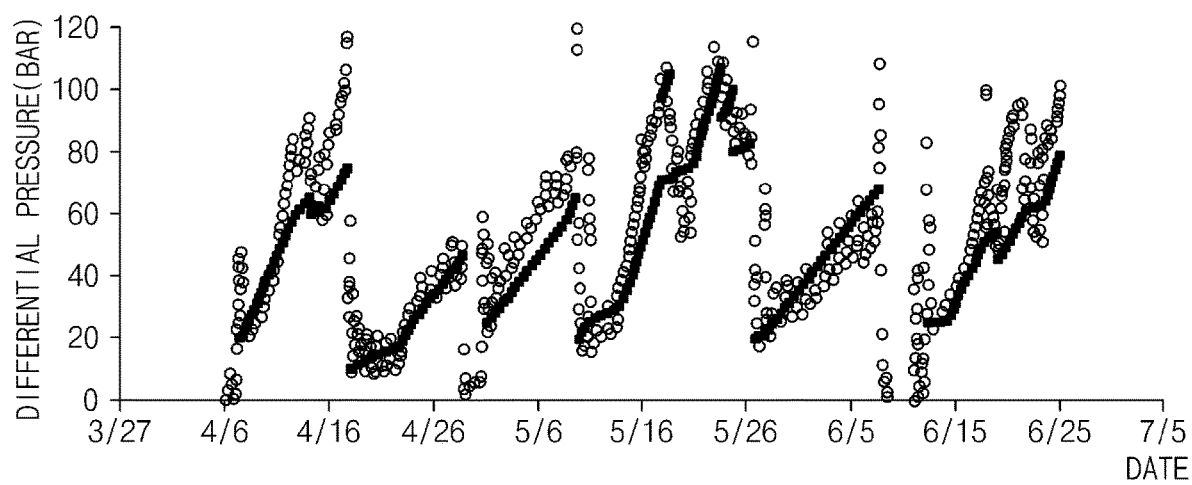
FIG. 4 is a graph illustrating the relationship between an actually measured differential pressure and an estimated (calculated) differential pressure according to the exemplary embodiment.

FIG. 4 is a graph illustrating the relationship between an actually measured differential pressure and an estimated (calculated) differential pressure according to the exemplary embodiment.

In FIG. 4, the "○" represents actually measured values, and the "■" represents values estimated according to the present embodiment.

It can be seen that the values estimated by the method according to the present embodiment are similar to the actually measured values.

After the differential pressure is calculated, if the calculated differential pressure is higher than a reference value (Step 150), the recovery system blockage estimation unit 40 determines that the blocking phenomenon has significantly occurred, and thus adjusts the input amount of an initiator to lower a pressure difference than a reference value (Step 160).

For example, the input amount of the initiator is adjusted to cause a calculated differential pressure to be lower than a reference value using a molecular weight distribution newly estimated by the method described in Step 130 according to the adjustment of the input amount of the initiator.

The above descriptions are merely provided to explain the technical art of the present invention, and it will be apparent to those of skill in the art that various modifications and variations can be made without departing from the intrinsic characteristics of the present invention. Therefore, the present embodiments disclosed in the present invention are provided not to limit, but to explain the technical idea of the present invention, and the scope of the technical idea of the present invention is not limited to the present embodiments. A range of protection of the present invention should be construed by the accompanying claims, and it should be interpreted that all technical ideas within the range equivalent thereto are included in the scope of the present invention.

INDUSTRIAL APPLICABILITY

The present invention may prevent blockage by estimating a degree of recovery system blockage by raw materials recovered in an EVA copolymerization process, thereby preventing a decrease in EVA quality due to the blockage phenomenon in a recovery process.

The invention claimed is:

1. A system for controlling an ethylene vinyl acetate (EVA) copolymerization process, comprising:
   a database for analysis configured to store analysis data obtained by matching processing conditions with measured data for first EVA produced under the processing conditions;
   a computer programmed to:
   estimate a VA content with respect to second EVA using the analysis data;
   estimate a molecular weight distribution of the second EVA using the VA content estimated and processing factors corresponding thereto; and
   estimate a recovery system blockage phenomenon using the VA content estimated and the molecular weight distribution estimated;
   wherein the computer is further programmed to calculate a differential pressure with respect to a flow of a recovered raw material in a copolymerization process for the second EVA using the VA content estimated in the computer and the molecular weight distribution estimated in the computer, and to adjust an input amount of an initiator when the differential pressure is higher than a reference value.

2. The system according to claim 1, wherein the computer is further programmed to estimate the recovered raw material in the copolymerization process with respect to the second EVA through mathematical optimization using the analysis data, and to estimate the VA content of the second EVA in which the estimated recovered raw material is reflected.

3. The system according to claim 2, wherein the computer is further programmed to determine a value of a recovered raw material that minimizes an error as a value of the recovered raw material estimated with respect to the second EVA by comparing a VA content and a molecular weight distribution, which are calculated using a pure raw material, with measured data for EVA produced under the same processing conditions of the analysis data stored in the database for analysis.

4. The system according to claim 1, wherein the computer is further programmed to estimate a molecular weight distribution through multivariate statistical analysis of the VA content value estimated and the input amount of the initiator in the copolymerization process for the second EVA.

5. The system according to claim 4, wherein the computer is further programmed to generate a statistical regression model with respect to a VA content, an amount of an initiator and a molecular weight distribution by performing regression analysis using the VA contents for the first EVAs and the input amount of the initiator, which are stored in the database for analysis, as independent variables, and the molecular weight distribution corresponding thereto as a dependent variable.

6. A method of controlling an ethylene vinyl acetate (EVA) copolymerization process, comprising:
    collecting analysis data and storing the analysis data in a database, wherein the analysis data is obtained by matching processing conditions with measured data for the EVA produced under the processing conditions;
    estimating a vinaly acetate (VA) content of EVA with respect to given processing conditions using the analysis data;
    estimating a molecular weight distribution of the EVA using the estimated VA content and the input amount of an initiator; and
    estimating a degree of recovery system blockage using the estimated VA content and the estimated molecular weight distribution, and
    adjusting an amount of the input amount of the initiator according to the estimated degree of blockage.

7. The method according to claim 6, wherein the estimating of a VA content includes:
    estimating a recovered raw material with respect to the copolymerization process under the processing conditions; and
    calculating a VA content corresponding to the estimated recovered raw material.

8. The method according to claim 6, wherein the estimating of a VA content includes:
    calculating a VA content and a molecular weight distribution of a pure raw material input to a reactor under the processing conditions;
    calculating an error by comparing the calculated VA content and the calculated molecular weight distribution with a measured VA content and a measured molecular weight distribution of EVA produced previously under the same conditions as the processing conditions;
    calculating an error by estimating a value of a recovered raw material that minimizes the error, calculating a VA content and a molecular weight distribution, in which the estimated value of the recovered raw material is reflected, and comparing the VA content and the molecular weight distribution with the measured VA content and the measured molecular weight distribution;
    calculating an error by revising the estimated value of a recovered raw material, calculating a VA content and a molecular weight distribution in which the revised, estimated value of the recovered raw material is reflected, and comparing the VA content and the molecular weight distribution with the measured VA content and the measured molecular weight distribution; and
    figuring out the value of the recovered raw material corresponding to the lowest error of the calculated errors and determining a calculated VA content corresponding thereto as an estimated VA content of the EVA.

9. The method according to claim 6, wherein the estimating of a molecular weight distribution includes:
    estimating a molecular weight distribution through multivariate statistical analysis for the estimated VA content and an input amount of an initiator corresponding thereto.

10. The method according to claim 9, wherein the multivariate statistical analysis is performed to generate a statistical regression model with respect to a VA content, the input amount of an initiator and a molecular weight distribution by performing regression analysis using the measured VA content of EVA and the input amount of an initiator in the process of producing the corresponding EVA as independent variables and molecular weight distribution corresponding thereto as a dependent variable.

11. The method according to claim 6, wherein the estimating of a degree of recovery system blockage includes:
    calculating a differential pressure of the recovery system using the estimated VA content and the estimated molecular weight distribution, and comparing the calculated differential pressure with a predetermined reference value.

* * * * *